Patented Jan. 9, 1934

1,942,544

UNITED STATES PATENT OFFICE 1,942,544

METHOD OF MANUFACTURING MODIFIED STARCHES, DEXTRINES, AND BRITISH GUMS

Arthur D. Fuller, New Rochelle, N. Y., assignor to National Adhesives Corporation, New York, N. Y., a corporation of Delaware No Drawing. Application January 5, 1931
Serial No. 506,735

22 Claims. (Cl. 127—38)

This invention relates to the manufacture from starch, either from root starches such as sago, tapioca, potato, or cassava, or from cereal starches, such as corn starch, or products known as modified or thin boiling starches, dextrines, British gums, or other hydrolysis products intermediate starch and dextrose.

One of the primary objects of the invention is to provide a method of modifying or converting starches which will be more economical and which will give products with more desirable characteristics than the methods heretofore used; and which, moreover, will make it possible to obtain more accurately and with greater certainty the particular qualities or groups of qualities desired in any particular product.

Another object is to provide a method of purifying low grade starches, such for example as sago starch or low grade tapioca starch, so that these relatively inferior and cheap starches may be used for the production of modified starches, dextrines or gums of first class quality and a further saving made in the cost of manufacture of such products. If these low grade starches are dextrinized by ordinary methods the products are slimy and dirty as compared with dextrines made from high grade starch.

The method of this invention is practiced in steps or stages as follows:

(a). *Chlorination.*—The starch in suspension in water, at any convenient density, is treated with a chemical agent which without producing any substantial amount of hydrolysis, sensitizes the starch, that is, makes it more susceptible to the influence of heat or heat and a catalyst in the subsequent modifying or hydrolyzing operation; and which, at the same time, if the starch contains the common insoluble impurities of low grade starches, acts upon these impurities, which are in part, presumably, of a nitrogenous, pectic cellulosic character, so as to make possible the subsequent removal of the same with substantial completeness and without the excessive starch losses incident to screening raw starch through fine silk.

For this first operation, which for convenience will be referred to as chlorination, although other effects are produced, the preferred chemical agent is an active chlorine compound preferably of alkaline reaction, (which does not leave in the starch a residual compound having a retarding effect on dextrinization) such for example as calcium hypochlorite—Ca(ClO)$_2$4H$_2$O)—or other hypochlorite of an alkali earth metal. Sodium hypochlorite could also be used with the addition of a salt of a kind to produce a catalytic effect at the dextrinizing stage, and so counteract the effect of the sodium salt which tends to retard hydrolysis; or sodium hypochlorite could be used without such additional salt if, as might be in some special cases, an inhibiting effect at the dextrinizing stage were desired. For reasons of convenience and economy, and for the manufacture of most of the degradation products of sarch contemplated by this invention, calcium hypochlorite is the preferred agent; and while the reactions between this agent and the starch material are doubtless very complex, it is apprehended that the following effects are produced: Oxidation of the starch to some extent; a destructive action on certain impurities, if impurities there be, in the starch, whereby such impurities may be washed out and the removal of impurities remaining insoluble such as fibrous material facilitated without excessive starch losses; decolorization of the material due probably to the oxidizing action above referred to; chlorination of the starch, by which is intended a chemical reaction between the available chlorine and the starch, as evidenced by the fact that the starch so treated retains the chlorine when heated unless specially treated with reducing agents; and the incorporation with the starch material of a residual chlorine salt, calcium chloride derived from the hypochlorite which appears to act as a catalyst at the dextrinization stage of the process. This treatment of the starch with calcium hypochlorite, preferably in an alkaline medium, or with an equivalent alkaline chlorine containing body, may be carried out at room temperature but is preferably performed at somewhat elevated temperatures substantially lower, however, than the gelatinizing temperature of the starch. The hypochlorite is introduced into the starch milk a little at a time over a considerable period of time and the magma is kept in agitation, preferably, until the available chlorine is completely absorbed, that is, until the chlorine in any form capable of reacting with the starch is all taken up by the starch. The amount of chlorine thus absorbed may vary from one-fourth of one per cent to six per cent on the dry basis weight of the starch. The preferable amount of chlorine absorbed for average operations is about one-half of one per cent. The calcium hypochlorite should be a clear solution, free from sludge and should be sufficiently alkaline to neutralize the acidity of the starch and so prevent undue loss of chlorine. Preferably the material at the chlorination stage has a pH of from 7.0 to 7.9, although a higher pH could be employed for larger amounts of chlorine.

While it is preferable to bring about the incorporation of the catalytic agent, such as calcium chloride, with the starch through a chlorination treatment which results in the presence of this agent as a residual salt, it is possible to obtain some of the advantages of the invention by incorporating this substance, or equivalent substances, such for example as aluminum chloride, with the starch directly either as a substitute for the chlorination treatment or in addition to such treatment.

If desired, however, the residual catalytic agent, the chlorine salt, such as calcium chloride, may be washed out of the starch by repeated filter pressing accompanied, preferably, by washing with fresh water as is frequently done in the operation of vacuum filters. In such case, if required for the particular product to be made, acid can be added to the starch and water magma to give the starch the proper pH value for dextrinization, in which case the acid constitutes the sole catalyst during hydrolysis.

(b). *Adjustment of pH.*—After chlorination is completed, the pH value of the starch milk is adjusted, by the addition of acid or alkali, to the point on the pH scale proper for the particular product which is to be manufactured. The pH will vary quite considerably as between British gums, dextrines, and thin boiling starches and specific examples will be given below of pH values appropriate for typical cases. From these examples it will be possible for those skilled in the art to make whatever adjustment in pH is required for the particular product in hand. Generally speaking, the pH values in accordance with the present invention will be higher than the values for corresponding products made in accordance with prior practice.

The matter of pH control is of great importance in the processes of the present invention if products of the highest quality are to be obtained since the starch to be dextrinized is very sensitive to the effect of acids; and through such control it has been found possible, in accordance with the principles of this invention, to produce starch degradation products having qualities not to be found in combination in a single product before, or at least not producible from certain of the commoner types of starches. For example, this invention makes possible the production of a British gum from corn starch which is much lighter in color than the British gums of the same solubility made previously from this kind of starch. Any suitable hydrolyzing acid, for example, hydrochloric acid, may be used for lowering the pH and any suitable basic substance, such for example, as lime may be employed for raising the pH value of the starch milk.

(c). *Dewatering and washing.*—After the pH of the starch milk has been properly adjusted in accordance with the product to be produced at the dextrinizing stage, a portion of the water is removed, for example, by passing the material through filter presses, preferably, for convenience, through filters of the vacuum type. If desired, the starch on the press may be washed with fresh water, which is feasible if the pH is at or near the neutral point. However, if the pH has been adjusted so as to be definitely on the acid or the alkaline side, it is better, in order not to disturb this adjustment, to subject the starch to a filtering and washing operation before the pH is adjusted, whereupon the starch may be put into suspension again for such pH adjustment. If the starch treated is a low grade starch such as sago starch or certain grades of tapioca starch, the chlorination treatment makes soluble some originally insoluble impurities. The remaining insoluble impurities may be removed by passing the starch milk through silk screens. The soluble impurities, those originally in the starch and those resulting from the chlorination, will be removed, so as to prevent buffer action on the acid or other catalyzer at the dextrinizing stage, by filter pressing, which may be done repeatedly if necessary in order to sufficiently reduce the solubles. By these operations a high degree of purification is obtained without excessive starch losses on the screens.

(d). *Dextrinization.*—This term is used, for convenience, although not quite accurately, to describe the modification or hydrolysis to which the chlorinated starch is subjected in order to produce the desired product, whether it be dextrine, properly speaking, thin boiling starch, British gum, or other like product. The characteristic features of the process at this stage are that, in the preferred operation of the process, drying and conversion or dextrinization take place simultaneously, and that, generally speaking, the pH values are higher and the temperatures lower than in the manufacture of products of corresponding type by methods heretofore used. The starch at the beginning of this stage of the process is moist, containing, ordinarily, about 45% of water, although the exact percentage of water is not of great importance. The starch has been acted upon, in some manner not fully understood but which has been demonstrated empirically, by the chlorination treatment. It has probably, as has been stated, been oxidized to some extent and contains chlorine chemically combined with the starch, it is believed. The starch may also contain calcium chloride which it is believed acts as a catalyzing agent in the subsequent hydrolysis of the starch. In any case the so-called chlorination treatment besides bleaching the starch and changing the physical character of certain impurities, if present, makes the starch more susceptible to hydrolysis than is ordinary raw starch; and as a consequence less heat is required for producing the same degree of hydrolysis, assuming that the pH of the starch is the same. Or at the same temperature a higher pH may exist and the same degree of hydrolysis be obtained. Or with the pH and/or temperature the same, the time of dextrinization may be shortened. This results in minimizing certain undesirable structural changes of obscure character produced in the starch by the dextrinizing operation, the improvement being evidenced particularly, in the products made by this invention, by lighter color, greater brilliancy, better fluidity, greater adhesiveness, and a more colloidal consistency when the product is made into a paste or glue. The aforesaid product of the chlorination treatment or the oxidation treatment equivalent thereto capable of producing end products having these characteristics, I term herein the "starch reaction product".

The simultaneous drying and dextrinization of the starch may be carried out in different ways and by use of different forms of apparatus. Temperature and time of treatment as well as pH value will, of necessity, vary in accordance with the characteristics desired in the product. The moist starch may be spread on canvas bottomed trays and moved through a low temperature drying kiln in which the temperature is maintained at from 140° F. to 280° F., this range being approximate and variable to meet different conditions. Or the moist starch may be caused to pass through inclined rotary driers of the drum type. Or the material may be first passed through the drying kilns or through the rotary driers and then put into ordinary jacketed dextrinizing vessels for the completion of the dextrinizing operation. If rotary driers are to be used, one may employ the drying apparatus of U. S. Patent No. 1,536,806 to J. J. Merrill, May 5, 1925, for Method of and apparatus for drying materials; although it is desirable to modify this apparatus by an arrangement which will permit the starch and the air to pass in the same direction through both of the drums. It is also desirable to provide the apparatus with means for varying the pitch of the drums so that the speed at which the material passes through the drums can be regulated in accordance with the product being manufactured. Where a high degree of dextrinization is required, in the case, for example, of British gums and the higher soluble dextrines, it is practically necessary, or at least advisable, to complete the dextrinization in an ordinary dextrinizing vessel. By this time the moisture has been very largely extracted from the starch. However, the dry starch is not acidulated at this stage. The acidulation, or equivalent incorporation into the starch of a catalyzing agent, takes place while the starch is wet and, as a consequence, the distribution of the acid or catalyst is much more perfect than would be possible if the acid were sprinkled upon or otherwise mixed with the dry starch, and more accurate control of the quantity of the catalyst used and of pH becomes possible.

It is not essential, although ordinarily preferable, that dextrinization take place during the drying operation in the kiln or rotary driers. With some types of dextrines and British gums, it is advisable to chlorinate the starch and, after the chlorine has been fixed, to dry the starch without appreciable dextrinization, as indicated by viscosity and soluble content, and to thereafter dextrinize the starch in the ordinary dextrinizing vessel. A chlorinated starch will dextrinize differently from a starch which has not been chlorinated.

The following are specific examples of the application of the invention to the production of particular products:

Example I—British gum

Corn starch purified by washing filters in the form of starch milk at a density of 21.6° Baumé (or any other convenient density) is preferably heated to 126° F. by running the same through a coil submerged in hot water. The starch milk is then run through a silk shaker screen into a tank and there gently agitated to keep the starch in suspension. The starch milk in the tank may be at about 120° F. Heating is to facilitate the subsequent filter pressing and is not essential.

The hypochlorite solution is previously prepared by passing chlorine gas into a deep tank containing lime water and adjusted so that there are thirty grams available chlorine per liter of solution. The clear solution is decanted or siphoned off from the sludge which must be carefully excluded as it is of alkaline reaction and would interfere with the dextrinization of the starch. The clear hypochlorite solution is thereafter carefully standardized by titration after reduction so that ten cubic centimeters of the solution require two cubic centimeters of tenth normal sulphuric acid to bring to neutrality to phenolphthalein. The starch will ordinarily be acid and the hypochlorite solution should be sufficiently alkaline to give the mixture a pH value of about 7.0 to 7.2. The solution should be added slowly. For example, the operation may require one-half hour to one hour. After the hypochlorite is completely added, the starch milk is agitated until the absorption of the available chlorine is complete. The amount of chlorine absorbed may vary. This particular example assumes an absorption of one-half per cent chlorine on the dry basis weight of the starch. The absorption may require three to four hours.

The pH of the starch magma is then adjusted to 7.3, and the magma put through a filter press to reduce its moisture content to approximately 45% and eliminate soluble impurities. In this state it is introduced into and caused to be passed successively through rotary drying drums, as above described, in which the air is heated to a temperature of about 300° F. The material requires twenty minutes to pass through the driers. It is then ground or screened to eliminate lumps and transferred to a dextrinizing vessel, of ordinary type, and heated, with constant agitation, for from ten to fifteen hours, the temperature being increased gradually during the first five to eight hours, depending on the amount of moisture in the starch, to about 300° F. and the material thereafter being held at that temperature. The product is a British gum having a solubility of 80% and a sugar content of 1%. The product is, however, much lighter in color than the ordinary British gum of this solubility.

Example II—Thin boiling starch

Corn starch is chlorinated with one-half per cent pure calcium hypochlorite on the basis of dry weight starch and the pH adjusted to from 1.5 to 2.2, preferably to 2.0 by addition of hydrochloric acid. If any of the root starches is used in place of corn starch, the pH may be higher as these starches are more sensitive to hydrolysis. The magma is dewatered in a filter to have a water content of 45%. The modification may be accomplished completely in twenty minutes in the rotary driers with the temperature of the air at about 300° F. The product will be a thin boiling starch of 60° fluidity on the corn products fluidity funnel scale. The product does not necessarily have to be ground since conversion is complete in the rotary driers. A more highly modified starch at the same pH or a starch of the same degree of modification at higher pH can be made by passing the chlorinated material through a tunnel kiln with the air heated to 220° F. for a drying and modifying period of say twenty hours. The long period of treatment allows the starch to reach the temperature of the air as well as prolonging the treatment.

Example III—High solubility dextrine

Corn starch is chlorinated with one-half per cent to one per cent pure calcium hypochlorite and the pH adjusted to 4. The magma is dewatered in the vacuum filter to a moisture content of 45% and first put through the rotary driers with the circulated air at 300° F. The material is preferably powdered, screened and then transferred to the dextrinizing vessel and heated at first to 200° F., the temperature gradually raised to 250° F. and maintained at this temperature for about six hours. The temperature is then raised to 275° F. and maintained for from six to ten hours. The product is a dextrine having a solubility of 99% and sugar content of 2% to 3%. Compared with corresponding products made by methods heretofore used, the product is lighter in color, has a lower sugar content, and is more brilliant and is less liable to turbidity when pasted and allowed to stand.

*Example IV—Thin boiling starch or low soluble dextrine from sago starch*

Sago starch, which may contain up to 3% of impurities and have a water content of from 15% to 20%, is mixed with water in proportion of one hundred pounds starch to one hundred fifty pounds of water. It is chlorinated with one-half per cent calcium hypochlorite. The absorption of the chlorine may require three hours, the magma having a pH of 7 during chlorination. The pH is then adjusted to 4.5 by addition of hydrochloric acid, the starch milk passed through silk shakers to remove impurities and the magma then dewatered to leave a water content of 47%. The material is then spread on canvas bottomed wood trays and caused to pass through an air blast kiln heated to 200° F. The passage through the kiln requires about twenty-four hours. The product may be described as a thin boiling starch or as a low soluble white dextrine. It has a solubility of 20%, a fluidity on the corn products scale of 94 and contains substantially no sugar. In spite of the fact that the product is made from a low grade starch which because of its impurities has not been considered available for the manufacture of dextrinized products of good quality, this product compares favorably with, and in fact in some respects is better, than corresponding products made, by the old methods, from highly purified corn or other starches. Apparently the chlorination dissolves certain of the impurities and frees the remaining insoluble impurities such as fibres so that screening and filter pressing eliminates a large proportion of impurities of both classes. In this filtering operation soluble salts and other soluble impurities of any organic nature which buffer the acid during hydrolysis and result in coloration of the products as ordinarily made from low grade starches are washed out so that lighter colored products result. The elimination of fibrous material prevents the slimy quality characteristic of dextrines made from low grade starches.

In place of sensitizing the starch by chlorination, the pretreatment of the starch to prepare it for dextrinization may be brought about, although with less desirable results, by the use of a non-chlorine containing oxidizing agent which will give nascent oxygen during dextrinization. Such a material is hydrogen peroxide, although other oxygen carriers can be used such as barium peroxide, sodium perborate, ammonium persulphate, and other salts that yield nascent, atomic or active oxygen upon heating with starch in the presence of water. In fact, starch by itself will decompose certain oxygen compounds and absorb the oxygen and in the process of absorbing it will be changed by the oxygen. For certain types of conversion products, a small amount of acid may be used in conjunction with the oxygen carrier. As a specific example, the starch milk may have incorporated with it 0.5% of Albone C (100 volume concentration hydrogen peroxide solution) on the dry weight of the starch; or 0.5% of barium peroxide and ¼% of muriatic acid. The pH of the starch milk is then adjusted, the magma dewatered and the starch dextrinized in accordance with the directions above given in connection with the treatment of chlorinated starch.

It will be understood that the method of this invention is not limited to the use of any particular apparatus. Nor is the invention limited to the production of any specific type of modified or dextrinized starch. There are a large number of starch degradation products intermediate raw starch and dextrose. These products have different solubilities, different degrees of fluidity, different degrees of coloration from pure white to a yellow or brownish color and, generally speaking, are different in texture and particularly in colloidal character when made up with water into pastes or glues. The intended use of the product sets the requirement as to its desired characteristics. Therefore it is obviously impossible to give specific directions for the production of each and every product of this series. From the specific examples given above and the statements as to changes in operating conditions, one skilled in the art will have no difficulty in producing any particular product which may be required.

By the term "chlorination" is intended a treatment of the starch with chlorine or a chlorine compound which brings about, to some extent at least, a chemical reaction between the chlorine and the starch. By "dextrinization" is intended any degree of modification or hydrolysis of the starch as evidenced by solubility and viscosity changes. By the term "catalyzer" or "catalytic agent" is intended any substance which promotes the hydrolysis or dextrinization of the starch without entering into the reaction so as to form part of the ultimate product.

I claim:

1. Dextrinization method which comprises reacting the starch with chlorine to produce a starch reaction product, adjusting the pH for the particular product desired and thereafter dextrinizing the starch reaction product.

2. Dextrinization method which comprises reacting the starch with chlorine to produce a starch reaction product, eliminating impurities and adjusting the pH for the particular product desired and thereafter dextrinizing the starch reaction product.

3. Dextrinization method which comprises oxidizing starch material to produce a starch reaction product, eliminating impurities, adjusting the pH of the starch and then dextrinizing the same reaction product.

4. Dextrinization method which comprises chlorinating the starch in suspension in water producing thereby a reaction starch product, removing the bulk of the water, and drying and dextrinizing the starch product.

5. Dextrinization method which comprises reacting starch in suspension in water with calcium hypochlorite producing thereby a chlorinated reaction starch product, removing the bulk of the water, and simultaneously drying and dextrinizing the starch.

6. Dextrinization method which comprises chlorinating starch in suspension in water producing thereby a reaction starch product, extracting a part of the water, drying and partially dextrinizing the starch product in a kiln or in rotary driers and completing the dextrinization with heat in agitation in a drying vessel.

7. Dextrinization method which comprises treating starch in suspension in water with calcium hypochlorite, adjusting the pH of the magma for the desired product, extracting the bulk of the water from the starch magma and thereafter drying and dextrinizing the starch.

8. Dextrinization method which comprises slowing reacting starch in suspension in water with calcium hypochlorite until the available chlorine is absorbed by the starch, screening and filtering the starch magma to eliminate insoluble and soluble impurities, adjusting the pH for the desired product and thereafter drying and dextrinizing the starch.

9. Dextrinization method which comprises treating starch in suspension in water with calcium hypochlorite until chlorine of the order of ½% of the dry basis weight of the starch is absorbed by the starch, screening and filtering the starch magma to eliminate insoluble and soluble impurities, adjusting the pH for the desired product and thereafter drying and partially dextrinizing the starch in a kiln or in rotary driers and completing the dextrinization of the starch, with heat in agitation, in a dextrinizing vessel.

10. The dextrinization method which consists in reacting starch with chlorine producing thereby a reaction starch product having an increased sensitiveness to hydrolysis and in thereafter dextrinizing the said starch product.

11. The dextrinization method which consists in reacting wet starch material with a chlorine containing body producing thereby a reaction product of starch and chlorine having substantially no increased solubility but having an increased sensitiveness to hydrolysis and in thereafter dextrinizing the said starch product.

12. The dextrinization method which consists in reacting starch with chlorine producing thereby a reaction starch product having an increased sensitiveness to hydrolysis and having incorporated therein as a result of the reaction a residual chlorine salt which has a catalytic effect in the subsequent hydrolysis of the product, and in thereafter dextrinizing the said starch product.

13. The dextrinization method which consists in slowly reacting wet starch with a hypochlorite solution until the available chlorine is absorbed by the starch producing thereby a reaction starch product, and in thereafter subjecting the said starch product to heat to dextrinize the same.

14. The dextrinization method which consists in slowly reacting starch with chlorine until from ¼% to 6% of chlorine on the dry basis weight of the starch is absorbed by the starch producing thereby a reaction starch product and in thereafter dextrinizing the said starch product.

15. The dextrinization method which consists in reacting starch with an agent such as a chlorine containing body of alkaline reaction producing thereby a reaction product of the starch and said agent having an increased tenderness or sensitiveness to hydrolysis and in thereafter dextrinizing the said starch product.

16. Dextrinization method which consists in reacting starch in suspension in water with a chlorine containing body producing thereby a chlorine reaction starch product, in adjusting the pH of the mixture by the addition of an acid and in thereafter dextrinizing the starch.

17. A process for the manufacture of soluble starch, dextrine and other hydrolysis products of starch comprising treating the starch with an oxidizing agent to tender the starch and produce a starch reaction product, adjusting the product at a predetermined pH according to the hydrolysis product desired to be produced, and drying and heating the same to a temperature and during a time period also depending upon the nature of the hydrolysis product desired to be produced.

18. The method of manufacturing a modified starch which consists in subjecting the starch material to the action of an oxidizing agent which sensitizes the starch, the said sensitized starch being a reaction product of the starch material and said agent, and in adjusting the pH value of said starch reaction product to a point depending upon the type of modified starch product desired.

19. The method of manufacturing a modified starch which consists in subjecting the starch material to the action of a chlorine containing body to produce a reaction product of the starch material and chlorine, and in adjusting the pH value of said starch reaction product to a point depending upon the type of modified product desired.

20. The method of claim 19 wherein the chlorine containing body is an alkaline hypochlorite and wherein the pH adjustment is obtained by the addition of either an alkali or an acid to the reaction starch product.

21. The method of manufacturing modified starch products from starches of various kinds which consists in slowly reacting wet starch material with a chlorine containing body of standardized alkalinity, producing thereby a reaction product of the starch material and chlorine, and in adjusting the pH value of said starch reaction product to a point depending upon the type of modified product desired.

22. The method of manufacturing a modified starch product which consists in subjecting the starch material to the action of a hypochlorite until chlorine of from ¼% to 6% on the dry basis weight of the starch is absorbed by the starch material and a reaction product of the starch material and chlorine is obtained, and in adjusting the pH value of said starch reaction product to a point depending upon the type of modified product desired.

ARTHUR D. FULLER.